May 29, 1928.　　　　　J. H. BECKER　　　　　1,671,624
LIQUID LEVEL INDICATOR
Filed Oct. 15, 1923

WITNESS:
H. Sherburne

INVENTOR
J. H. Becker.
BY White Print Evans
his ATTORNEYS

Patented May 29, 1928.

1,671,624

UNITED STATES PATENT OFFICE.

JULIUS H. BECKER, OF SAN FRANCISCO, CALIFORNIA, ASSIGNOR, BY MESNE ASSIGNMENTS, OF ONE-HALF TO AMERICAN RESEARCH AND DEVELOPMENT COMPANY, A CORPORATION OF DELAWARE.

LIQUID-LEVEL INDICATOR.

Application filed October 15, 1923. Serial No. 668,621.

The invention relates to a device for indicating the amount of liquid in a tank.

An object of the invention is to provide means for indicating the amount of liquid in a tank situated at a remote point.

Another object of the invention is to provide an indicating means which is not influenced by variations in atmospheric temperature and pressure.

Another object of the invention is to provide a gasoline gauge for use on automobiles, to disclose on an indicating instrument on the dash the exact amount of gasoline in the supply tank, regardless of the position of the automobile and regardless of atmospheric temperature and pressure conditions.

The invention possesses other advantageous features, some of which, with the foregoing, will be set forth at length in the following description, where I shall outline in full, that form of my invention which I have selected for illustration in the drawings accompanying and forming part of the present specification. In said drawings I have shown one form of device embodying my invention, but it is to be understood that I do not limit myself to such form, since the invention, as set forth in the claims, may be embodied in a plurality of forms.

Referring to said drawings:—

Figure 1:
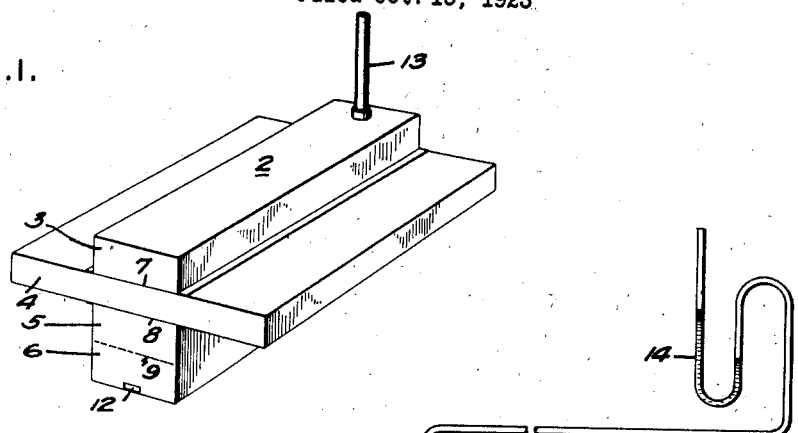
Figure 1 is a perspective view of the device of my invention.
Figure 2:
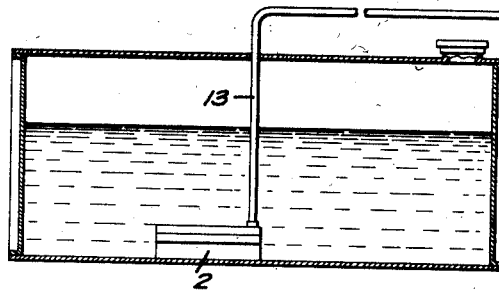
Figure 2 is a diagrammatic representation of the device of my invention installed in a gasoline tank and connected with a pressure indicating instrument.
Figure 3:
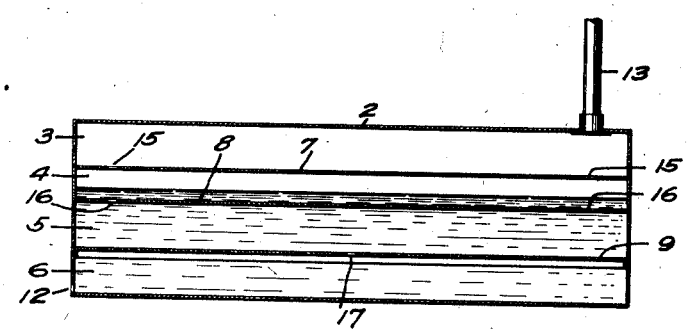
Figure 3 is a longitudinal section through the device of my invention.
Figure 4:
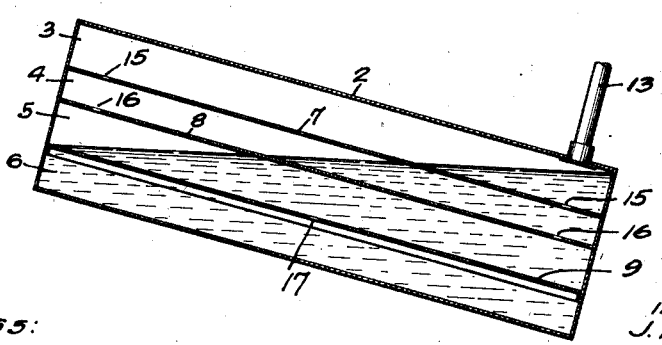
Figure 4 is a similar view of the device placed at an angle, such as it assumes when the automobile is standing at the curb.

The present device is particularly adapted to be used to indicate the amount of gasoline in the supply tank of an automobile, although it may be used to indicate the amount of liquid in any tank or container. It may also be employed to indicate the level of the liquid in any stationary or moving body of liquid. The device is designed to compensate for differences in atmospheric temperature and pressure, so that it always indicates exactly the amount or the level of the liquid. The indicating instrument is calibrated to indicate either level or volume and, when used in connection with the supply tank of an automobile, the indicating instrument is preferably calibrated to indicate volume since many automobile tanks are cylindrical in form, so that the volume contained therein at any particular time does not correspond directly with the depth of the liquid in the tank.

The device of my invention comprises a casing 2 composed of a plurality of chambers or compartments 3, 4, 5 and 6. These compartments are separated by the walls 7, 8 and 9 and these walls are provided with suitable apertures to permit the transfer of pressure from one chamber to the other. The lower chamber 6 is preferably provided in one end with an aperture 12, adjacent its bottom, to permit the liquid to flow into the chamber 6. The casing is usually arranged within the tank at the bottom of the tank so that when the tank is filled with liquid, the casing is submerged, but it may be arranged above the tank and the aperture 12 connected to the bottom of the tank by a suitable tube or conduit. The chamber 3 is connected by an impervious tube 13, preferably a copper tube, to the indicating instrument 14 which may be of any desired construction. The tube 13 is filled with air or gas so that the relative vertical positions of the casing 2 and the indicator 14 will not cause a variation in reading of the indicator 14. The tube 13 is continuously filled with gas and means are provided for preventing the entry of liquid into this tube, since the presence of liquid in the tube would produce an improper reading on the indicator. Means are also provided to prevent variations in volume of the air in the tube, due to atmospheric temperature changes, from causing a variation in the indicator reading.

The chamber 4 within the casing and which may be termed the displacement chamber is made larger in its horizontal dimension so that a very small vertical displacement of liquid in this chamber will produce a large change in the volume of gas in the chamber. The chamber 4 is designed so that at all times it is partially filled with liquid and partially filled with gas. When the gasoline tank is full and the atmospheric temperature is low, the level of the gasoline in the chamber 4 may approach the top wall 7 thereof. When the gasoline tank is substantially empty and the atmospheric temperature is high, the level of the gasoline in the chamber 4 will approach the lower wall 8 thereof. The chamber 4 has a very small vertical dimension and comparatively large horizontal dimension so that the expulsion of substantially all of the air in this chamber is accomplished by a very slight rise in the level of the liquid in the chamber.

The wall 7 separating the chambers 3 and 4, is provided adjacent its opposite ends with apertures 15 through which pressure may be transmitted from the chamber 4 to the chamber 3. The pressure produced in chamber 3 is directly proportional to the level of the liquid in the tank and this pressure is transmitted through the tube 13 to the gauge 14. An increase in temperature of the tube 13, causing an expansion of the air therein will cause the movement of some air from the chamber 3 into the chamber 4 lowering the level of the liquid therein practically an infinitesimal amount. The pressure in the chamber 3 is dependent upon the static head between the liquid in the tank and the liquid in the chamber 4 and since the level of the liquid in the chamber 4 is substantially constant, variations in temperature will not produce variations in pressure in the tube 13.

The casing 2 is normally arranged within the gasoline tank in a horizontal position but frequently happens, as when the automobile is standing at the curb, that the gasoline tank is inclined so that the casing is no longer horizontal. In this position, with the gasoline tank full, the gasoline may run into the chamber 3 and means are provided for preventing this gasoline from being drawn up into the tube 13 and thus producing an improper reading of the indicator. It is apparent that if the automobile is inclined sufficiently to submerge the aperture between the chambers 3 and 4 in the gasoline and the air within the tube 13 contracts, that gasoline will be drawn up into the tube 13. To prevent the gasoline from being drawn up into the tube 13 I have provided the wall 7 with ports or apertures 15 at opposite sides thereof so that regardless of the direction in which the casing 2 is inclined, one of these apertures is always above the level of the gasoline so that the contraction of the air in the tube 13 will cause the flow of air into the tube, the air passing from the chamber 4 through the uncovered opening 15 into the chamber 3. The wall 7 also serves as a baffle wall to prevent the liquid from splashing into the tube 13 but allowing movement of the air.

Means are also provided for preventing any of the air trapped in the chambers 3 and 4 from becoming lost, thereby interfering with the proper reading of the indicator. The wall 8 separating the chambers 4 and 5 is provided with apertures 16 adjacent its end and if any air passes through these apertures into the chamber 5, forming bubbles therein, it will soon find its way back through these apertures into the chamber 4. Due to a sudden lurch of the automobile some air may be expelled through one of the apertures 16 into the chamber 5, but this air, in the form of a bubble, will remain in contact with the under side of the wall 8 and as the automobile moves, will gradually find its way to one of the apertures 16. To prevent this air which passes down through the apertures 16, from becoming lost, I provide the dividing wall 9 and the chamber 6, these elements producing additional assurance that no air will be lost. The wall 9 is provided with a port 17 at its center connecting the chambers 5 and 6 and the inlet port 12 of the chamber 6 is arranged adjacent the bottom thereof so that in order that air might escape from the system it is necessary that it pass down through the apertures 16 across the chamber 5, which is filled with liquid, through the apertures 17 and across the chamber 6 which is also filled with liquid. Any movement of the automobile which will result in the loss of air from the casing would be sufficient to wreck the automobile. The chambers 5 and 6 are narrow and serve as conduits to permit the liquid to flow into and out of the chamber 4 as the level of the liquid in the tank varies. The chamber 3 is also in the nature of a conduit and serves to prevent the entry of liquid into the tube 13.

The device compensates for variations in atmospheric temperature and also in barometric pressure so that the indicator 14 at all times shows exactly the amount of liquid in the tank. Jolting and lurching of the automobile will not interfere with the accuracy of the indicator and, since the arrangement is such that under normal operating conditions, no gasoline can enter tube 13, the indicator 14 will always indicate the exact amount of gasoline in the tank.

I claim:

1. A device for indicating the level of the liquid in a tank comprising a casing adapted to be submerged in the liquid, a tube connecting said casing to a pressure indicating instrument, said casing comprising an elongated horizontal displacement chamber adapted to be normally partially filled with liquid and partially filled with gas, a superposed chamber to which said tube is connected, said chambers being separated by a wall having apertures therein at the ends, a chamber below said elongated chamber, the separating wall between said latter chambers being provided with apertures adjacent the ends.

2. A device for indicating the level of the liquid in a tank, comprising an indicator actuated by pressure due to the depth of the liquid in the tank, a tube enclosing a pressure transmitting medium and extending from the indicator to a casing disposed in the tank and opening into the tank adjacent the bottom thereof, said casing being divided by horizontal walls into four superposed chambers, the upper and first chamber being connected to the tube, the lower and fourth chamber opening into the tank, the second chamber comprising a displacement chamber which is normally partially filled with the liquid and partially filled with gas, the wall separating said first and second chambers being provided adjacent its ends with apertures, the wall separating the second and third chambers being provided at its ends with apertures and the wall separating the third and fourth chambers being provided at its center with an aperture.

3. In a device for indicating the level of liquid in a tank comprising a casing adapted to be submerged in the liquid; said casing comprising a displacement chamber of relatively large horizontal cross-sectional area adapted to be partially filled with liquid and partially filled with gas, means communicating with said chamber for connection to a pressure responsive indicator, a second chamber of relatively smaller horizontal cross-sectional area below said displacement chamber and provided with a passageway for communication with the liquid in the tank, and an apertured wall separating said chambers.

4. In a device for indicating the level of liquid in a tank comprising a casing adapted to be submerged in the liquid; said casing comprising a displacement chamber of relatively large horizontal cross-sectional area adapted to be partially filled with liquid and partially filled with gas, means communicating with said chamber for connection to a pressure responsive indicator, a second chamber below said displacement chamber, a third chamber below said second chamber and provided with an aperture communicating with the liquid in the tank, a wall separating said displacement and second chambers being apertured adjacent its edges, and a wall separating the second and third chambers being apertured substantially at its center.

5. A device for indicating the level of the liquid in a tank comprising an indicator actuated by pressure due to the depth of liquid in the tank, means for transmitting fluid pressure and extending from the indicator to a casing disposed in the tank and opening into the tank adjacent the bottom thereof, said casing being divided into a plurality of superposed chambers by a plurality of dividing walls, said chambers comprising an upper chamber which is connected to the tube, a displacement chamber below said upper chamber which is normally partially filled with liquid and partially filled with gas, and a lower chamber opening into the tank, the dividing wall forming the bottom of the upper chamber being provided with apertures adjacent its edges, and the dividing wall forming the top of the lower chamber being apertured only adjacent its center.

6. A device for indicating the level of the liquid in a tank comprising an indicator actuated by pressure due to the depth of liquid in the tank, means for transmitting fluid pressure and extending from the indicator to a casing disposed in the tank and opening into the tank adjacent the bottom thereof, said casing being divided into a plurality of superposed chambers by a plurality of dividing walls, said chambers comprising an upper chamber which is connected to the tube, a displacement chamber below said upper chamber and in communication with the same, said displacement chamber being normally partially filled with liquid and partially filled with gas, a lower chamber opening into the tank, and a chamber intermediate and in communication with said lower chamber and displacement chamber, the dividing wall forming the bottom of said upper chamber being apertured adjacent its ends, the dividing wall forming the bottom of said intermediate chamber being apertured adjacent its center.

In testimony whereof, I have hereunto set my hand.

JULIUS H. BECKER.